United States Patent
Snape et al.

(10) Patent No.: US 11,549,728 B2
(45) Date of Patent: Jan. 10, 2023

(54) GAS TURBINE ENGINE WITH TRANSCRITICAL VAPOR CYCLE COOLING

(71) Applicant: Raytheon Technologies Corporation, Farmington, CT (US)

(72) Inventors: Nathan Snape, Tolland, CT (US); Joseph Brent Staubach, Colchester, CT (US)

(73) Assignee: Raytheon Technologies Corporation, Farmington, CT (US)

(*) Notice: Subject to any disclaimer, the term of this patent is extended or adjusted under 35 U.S.C. 154(b) by 111 days.

(21) Appl. No.: 17/060,513

(22) Filed: Oct. 1, 2020

(65) Prior Publication Data
US 2021/0018228 A1    Jan. 21, 2021

Related U.S. Application Data

(63) Continuation of application No. 15/269,217, filed on Sep. 19, 2016, now Pat. No. 10,823,462.

(51) Int. Cl.
*F25B 9/00* (2006.01)
*F02C 3/04* (2006.01)
(Continued)

(52) U.S. Cl.
CPC ............... *F25B 9/008* (2013.01); *F02C 3/04* (2013.01); *F02C 7/185* (2013.01); *F02C 7/222* (2013.01);
(Continued)

(58) Field of Classification Search
CPC .. F25B 9/004; F25B 9/008; F25B 9/06; F25B 40/02; F25B 40/04; F25B 2309/00;
(Continued)

(56) References Cited

U.S. PATENT DOCUMENTS

| 6,182,435 B1 * | 2/2001 | Niggemann ........... B64D 13/00 60/772 |
| 6,817,193 B2 | 11/2004 | Caesar et al. |
| 8,327,691 B2 | 12/2012 | Drane et al. |
| 8,613,195 B2 | 12/2013 | Held et al. |

(Continued)

OTHER PUBLICATIONS

European Search Report for European Application No. 17191939.2 dated Nov. 7, 2017.

(Continued)

*Primary Examiner* — Loren C Edwards
(74) *Attorney, Agent, or Firm* — Carlson, Gaskey & Olds, P.C.

(57) ABSTRACT

A gas turbine engine has a compressor section, a combustor, and a turbine section. An associated fluid is to be cooled and an associated fluid is to be heated. A transcritical vapor cycle heats the fluid to be heated, and cools the fluid to be cooled. The transcritical vapor cycle includes a gas cooler in which the fluid to be heated is heated by a refrigerant in the transcritical vapor cycle. An evaporator heat exchanger at which the fluid to be cooled is cooled by the refrigerant in the transcritical vapor cycle. A compressor upstream of the gas cooler compresses the refrigerant to a pressure above a critical point for the refrigerant. An expansion device expands the refrigerant downstream of the gas cooler, with the evaporator heat exchanger being downstream of the expansion device, and such that the refrigerant passing through the gas cooler to heat the fluid to be heated is generally above the critical point.

14 Claims, 6 Drawing Sheets

(51) Int. Cl.
  *F02C 7/18* (2006.01)
  *F02C 7/22* (2006.01)
  *F02C 7/224* (2006.01)
  *F25B 9/06* (2006.01)
  *F25B 40/02* (2006.01)

(52) U.S. Cl.
  CPC .............. *F02C 7/224* (2013.01); *F25B 9/004* (2013.01); *F25B 9/06* (2013.01); *F25B 40/02* (2013.01); *F25B 2309/005* (2013.01); *F25B 2309/061* (2013.01); *F25B 2339/047* (2013.01); *F25B 2400/14* (2013.01)

(58) Field of Classification Search
  CPC ........... F25B 2309/005; F25B 2309/06; F25B 2309/061; F25B 2339/047; F25B 2400/14; F02C 3/04; F02C 7/14; F02C 7/16; F02C 7/185; F02C 7/22; F02C 7/222; F02C 7/224
  See application file for complete search history.

(56) References Cited

U.S. PATENT DOCUMENTS

| | | | |
|---|---|---|---|
| 9,316,141 B2 | 4/2016 | Pilavdzic | |
| 9,358,859 B2 | 6/2016 | Taras et al. | |
| 2003/0167791 A1* | 9/2003 | Chordia | F25B 49/022 62/498 |
| 2005/0061012 A1 | 3/2005 | Zywiak et al. | |
| 2012/0297780 A1 | 11/2012 | Bruno et al. | |
| 2012/0312037 A1* | 12/2012 | Finney | B64D 37/34 62/115 |
| 2014/0260340 A1 | 9/2014 | Vaisman et al. | |
| 2015/0007600 A1 | 1/2015 | Godecker et al. | |

OTHER PUBLICATIONS

European Search Report for European Application No. 19195234.0 dated Sep. 30, 2019.
European Search Report for EP Application No. 22163661.6 dated Apr. 8, 2022.

* cited by examiner

GAS TURBINE ENGINE WITH TRANSCRITICAL VAPOR CYCLE COOLING

CROSS-REFERENCE TO RELATED APPLICATIONS

This application is a continuation of U.S. patent application Ser. No. 15/269,217 filed on Sep. 19, 2016.

BACKGROUND OF THE INVENTION

This application relates to a gas turbine engine, wherein a transcritical vapor cycle is included to transfer heat from a system to be cooled to a system to be heated.

Gas turbine engines are known and typically include a fan delivering air into a bypass duct as propulsion air. The fan also delivers air into a compressor where it is compressed and then delivered into a combustor. Air is mixed with fuel in the combustor and ignited. Products of the combustion pass downstream over turbine rotors driving them to rotate. The turbine rotors, in turn, drive the compressor and fan rotors.

Gas turbine engines include a number of supporting systems. As an example, a fuel system supplies the fuel to the combustor. It is known to heat the fuel.

In addition, complex controls and other components must be cooled. As such, it is known to provide various heat exchangers for cooling, and heating, fluids associated with the gas turbine engine.

Recently, in the refrigeration field, traditional refrigerants have been replaced by $CO_2$, as it is environmentally benign as compared to traditional refrigerants. $CO_2$, in particular, supports a refrigerant cycle known as a transcritical vapor cycle. In a transcritical vapor cycle, the fluid is cooled after compression as a vapor, rather than moving to a liquid. This allows a good deal more heat transfer than a traditional refrigerant system. However, transcritical vapor cycles have not been incorporated into gas turbine engines.

SUMMARY OF THE INVENTION

In a featured embodiment, a gas turbine engine has a compressor section, a combustor, and a turbine section. An associated fluid is to be cooled and an associated fluid is to be heated. A transcritical vapor cycle heats the fluid to be heated, and cools the fluid to be cooled. The transcritical vapor cycle includes a gas cooler in which the fluid to be heated is heated by a refrigerant in the transcritical vapor cycle. An evaporator heat exchanger at which the fluid to be cooled is cooled by the refrigerant in the transcritical vapor cycle. A compressor upstream of the gas cooler compresses the refrigerant to a pressure above a critical point for the refrigerant. An expansion device expands the refrigerant downstream of the gas cooler, with the evaporator heat exchanger being downstream of the expansion device, and such that the refrigerant passing through the gas cooler to heat the fluid to be heated is generally above the critical point.

In another embodiment according to the previous embodiment, the fluid to be heated is fuel passing to the combustor.

In another embodiment according to any of the previous embodiments, the fuel to be cooled is a cooling fluid for a component on the gas turbine engine.

In another embodiment according to any of the previous embodiments, the component to be cooled is electronics.

In another embodiment according to any of the previous embodiments, the fuel has an optional return line downstream of the gas cooler for returning fuel to a fuel tank and at least one return line heat exchanger provided on the return line to cool the fuel before being returned to the fuel tank.

In another embodiment according to any of the previous embodiments, the return line heat exchanger includes a heat exchanger cooled by ram cooling air.

In another embodiment according to any of the previous embodiments, the return line heat exchanger includes a second heat exchanger cooled by air from an air cycle machine.

In another embodiment according to any of the previous embodiments, the return line heat exchanger is cooled by air from an air cycle machine.

In another embodiment according to any of the previous embodiments, a precooling heat exchanger is positioned between a fuel tank and the gas cooler to precool the fuel before fuel is heated in the gas cooler.

In another embodiment according to any of the previous embodiments, the expansion device is a turbo expander.

In another embodiment according to any of the previous embodiments, the turbo expander is configured to drive a shaft to provide drive input to the compressor.

In another embodiment according to any of the previous embodiments, the expansion device is a fixed expansion device.

In another embodiment according to any of the previous embodiments, the transcritical vapor cycle is provided with a downstream heat exchanger downstream of the gas cooler for cooling the refrigerant before it reaches the expansion device.

In another embodiment according to any of the previous embodiments, the downstream heat exchanger is cooled by air from an air cycle machine.

In another embodiment according to any of the previous embodiments, the downstream heat exchanger includes a second heat exchanger cooled by ram air.

In another embodiment according to any of the previous embodiments, the downstream heat exchanger is cooled by ram air.

In another embodiment according to any of the previous embodiments, the fluid to be cooled is fuel returning from a fuel supply system to a fuel tank.

In another embodiment according to any of the previous embodiments, the majority of the refrigerant in the evaporator heat exchanger is below the critical point.

In another embodiment according to any of the previous embodiments, the fluid to be heated is air in a bypass duct.

In another embodiment according to any of the previous embodiments, the refrigerant is $CO_2$.

These and other features may be best understood from the following drawings and specification.

DETAILED DESCRIPTION

Figure 1:
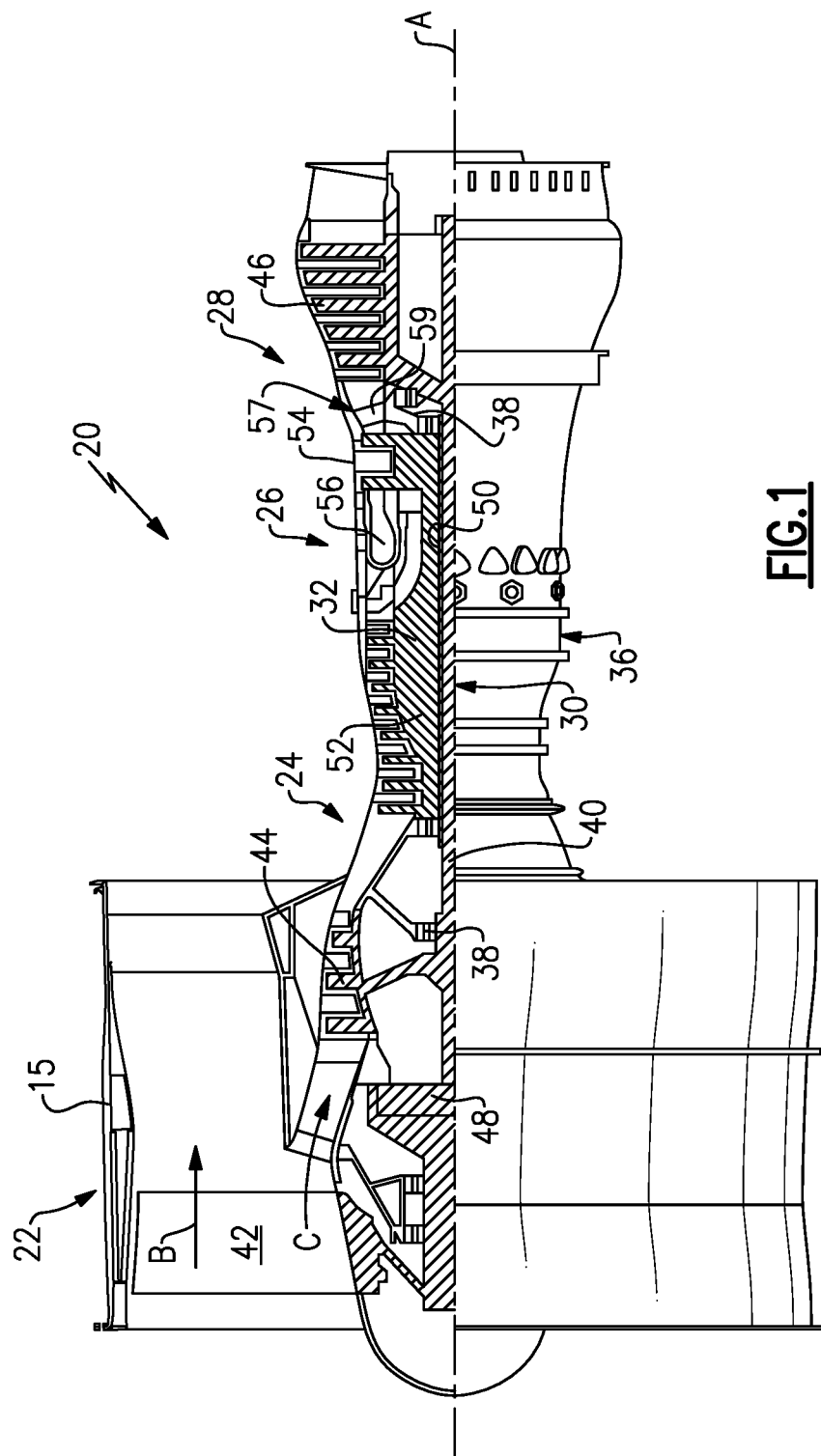
FIG. 1 schematically shows a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a bypass duct defined within a nacelle 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150 ft/second (350.5 meters/second).

While FIG. 1 does illustrate a geared turbofan engine, it should be understood that this disclosure extends to any type gas turbine engine, including direct drive, military, etc.

Figure 2:
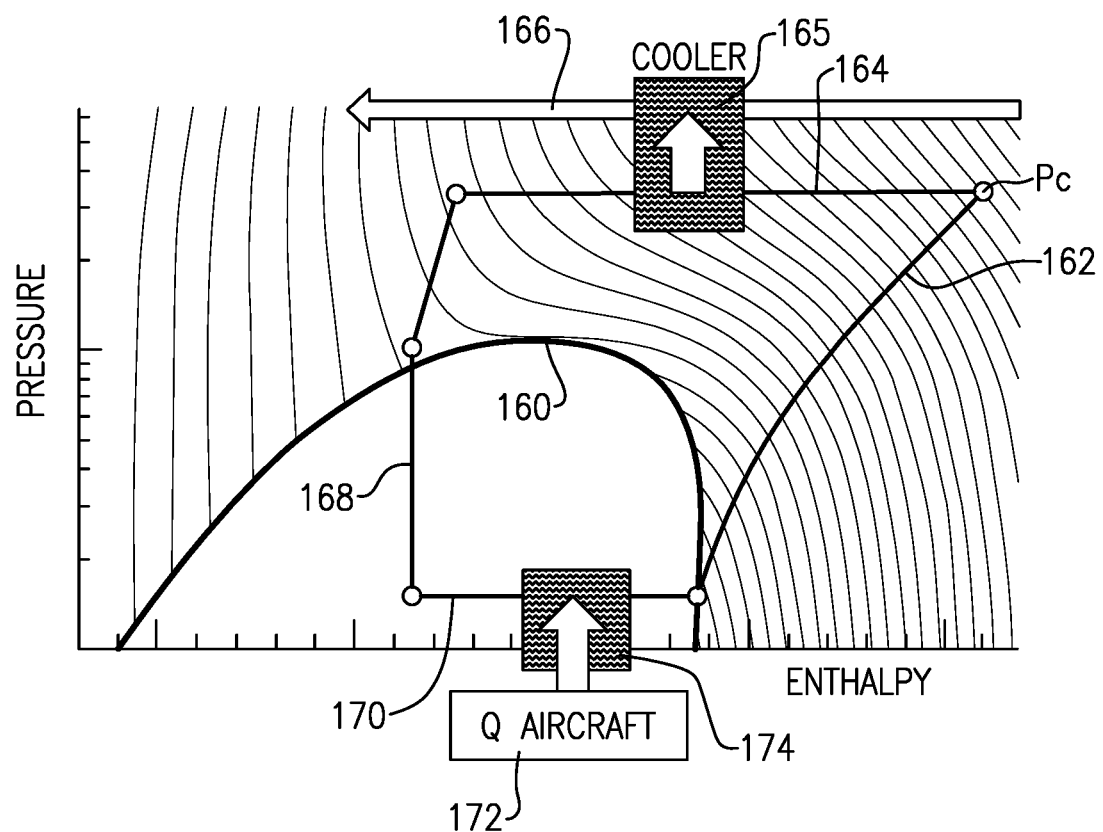
FIG. 2 shows a pressure enthalpy diagram for a vapor cycle operating in the transcritical realm.

FIG. 2 is a chart of pressure versus enthalpy for a refrigerant cycle which may use $CO_2$ as the refrigerant. The curve is unique for each refrigerant. As shown, the curve includes a critical point 160. The critical point is the highest pressure for a particular refrigerant at which condensation can still occur. Line 162 shows the compression phase. As can be seen, the compression phase moves the refrigerant up to pressure Pc well-above point 160. The refrigerant is then cooled in the process shown at line 164, in gas cooler 165. Note, this process occurs without condensation. This will provide a good deal of heat into a fluid in line 166, which may be fuel. It is known that it is desirable to preheat fuel on its way to the combustor. Work may then be taken out of the refrigerant at line 168 through an expansion process. This brings the refrigerant back down under the point 160. There is then a heat absorption process taking place along line 170 wherein heat 172 from an aircraft system is delivered into the refrigerant at heat exchanger 174. The process then repeats.

Such a cycle is known as transcritical in that the heat reduction in heat exchanger 165 occurs, essentially entirely, with a refrigerant in vapor or gas phase, and above the critical point 160. On the other hand, some of the processes occur below the critical point 160. In a standard refrigerant cycle, the heat exchanger 165 might be known as a condenser, however, in a transcritical vapor cycle it is known as a gas cooler. There is "high thermal lift," with such a system meaning a good deal more heat can be transferred into the fuel 166 than is the case with a traditional refrigerant system.

Figure 3:
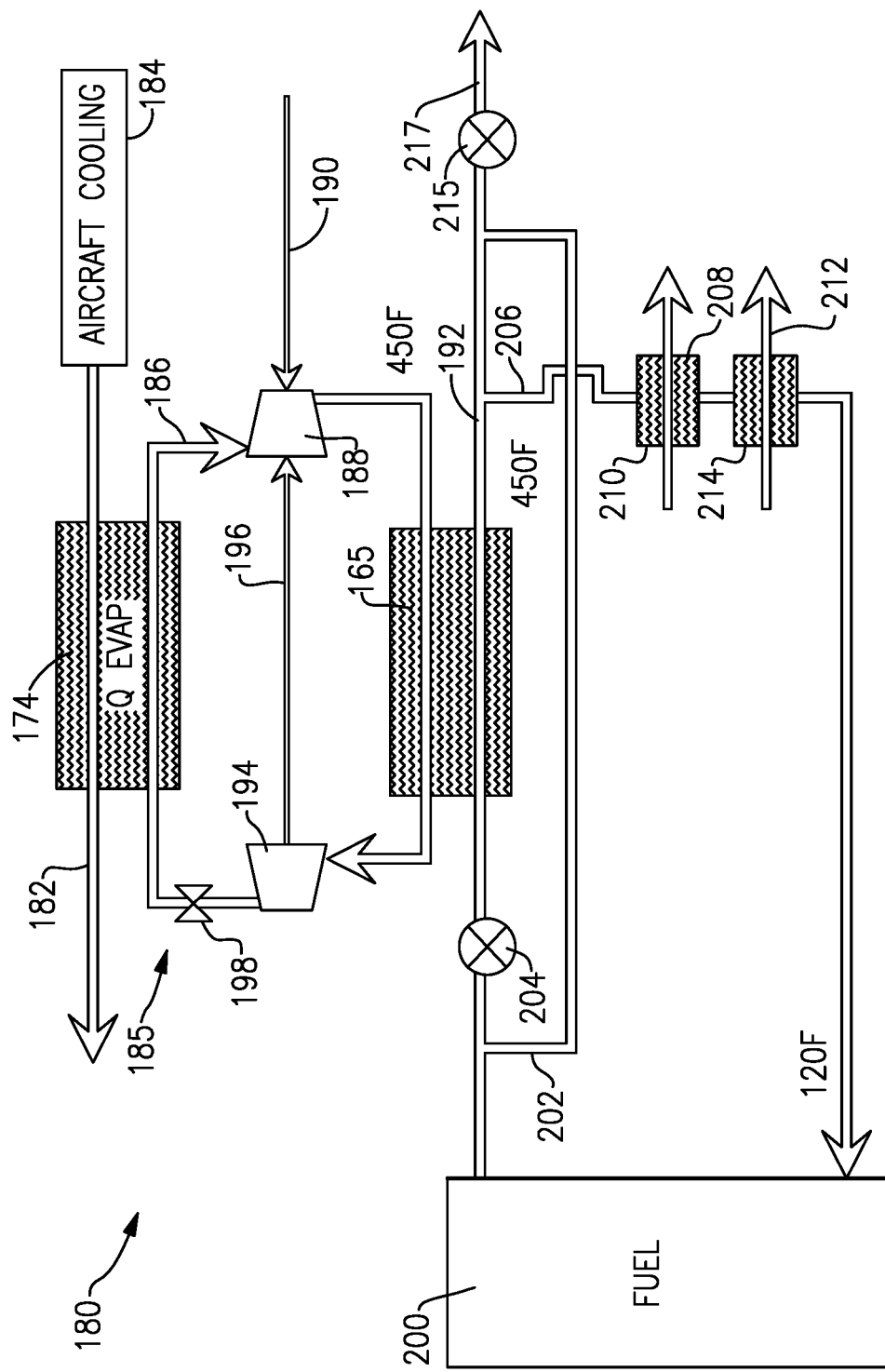
FIG. 3 shows a first schematic of a first system.

FIG. 3 shows a first system 180, which may be incorporated into a gas turbine engine such as the engine shown in FIG. 1. System 180 transfers a fluid 182 used for aircraft cooling, such as cooling electronics 184, or oil from an oil cooler function, or any number of other functions. Heat is exchanged in the heat exchanger 174 with refrigerant in line 186, which is in a transcritical vapor cycle 185. This cools the fluid in line 182. The refrigerant downstream of the heat exchanger 174 passes to a compressor 188, which compresses the refrigerant and passes it through the gas cooler heat exchanger 165. The gas cooler 165 heats a fluid such as fuel in line 192. Downstream of gas cooler 165, the refrigerant is expanded across a turbo expander 194 and an optional expansion device 198. A drive 190 drives the compressor 188. The turbo expander 194 may also drive a shaft 196 to supplement the drive to the compressor 188, although this is optional. In other embodiments, the expansion device 198 may be used in place of the turbo expander 194. Since the vapor cycle 185 is a transcritical cycle, components designed for use with such cycles are preferably utilized.

The fuel comes from a fuel tank 200. The fuel may be bypassed at 202 around the gas cooler 165 by controlling a valve 204. This might be done should there be a need for fuel at the combustor which would exceed a need, or practical capacity, at the gas cooler 165 to heat the fuel. The gas cooler 165 is capable of heating the fuel, for example, to temperatures on the order of 450° F. A line 206 is shown for selectively returning fuel to the tank 200. However, given that the fuel in line 206 downstream of the heat exchanger 165 is hot, it should be cooled before being returned to tank 200. Thus, post cooler heat exchanger 208 is shown, which may receive ram cooling air 210. In addition, or alternatively, a heat exchanger 214 may receive air 212 from an air cycle machine for cooling the fuel. A metering valve 215 meters the amount of fuel delivered to line 217, which then passes to the combustor.

By utilizing the vapor cycle 185, a great deal more heat transfer can be achieved than would be the case with a traditional refrigerant system without providing unusually large, heavy components.

Figure 4:
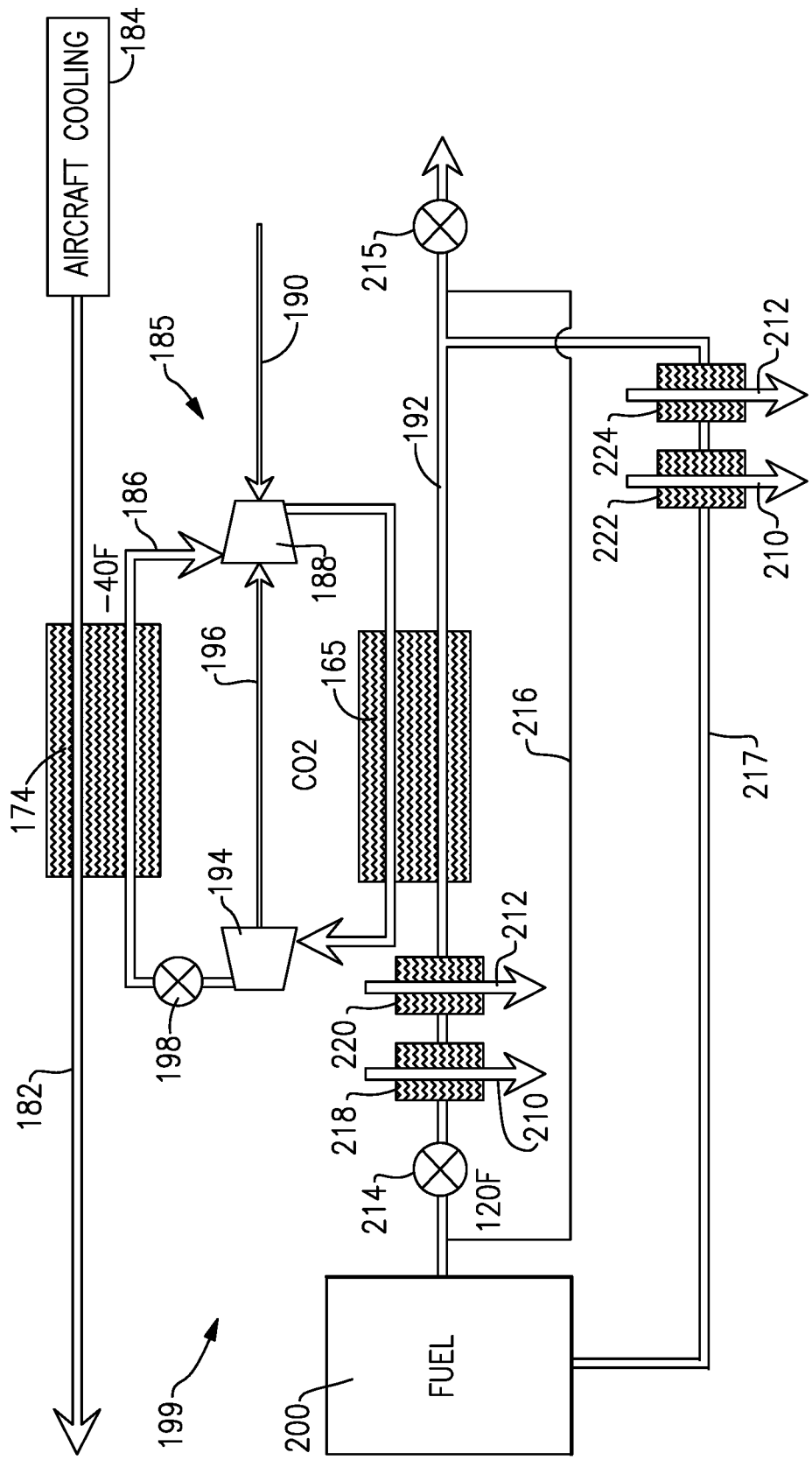
FIG. 4 shows a schematic of a second system.

FIG. 4 shows a system 199, wherein similar components are shown by similar numbers. In this system, the valve 214 controls the bypass into line 216 similar to the FIG. 3 embodiment. A return line 217 is provided with a cooling heat exchanger 222 cooled by ram air 210 and/or a heat exchanger 224 cooled by air cycle machine air 212. Further, heat exchangers 218 and 220 are cooled by ram air 210 and air cycle machine air 212, respectively.

The heat exchangers 218 and 220 could be "pre-coolers" while the heat exchangers 222 and 224 could be "post-coolers." The use of the return line 217 allows a greater amount of fuel to pass through the heat exchanger 165 than may be necessary for the engine (via control of valve 215). This allows the rejection of a greater amount of heat than might otherwise be the case. The pre-coolers and the post-coolers may be utilized in combination, or separately, dependent on the needs of a particular application. The pre-coolers allow a greater amount of heat to be extracted from the transcritical vapor cycle, without heating the fuel to an undesirably high temperature.

Figure 5:
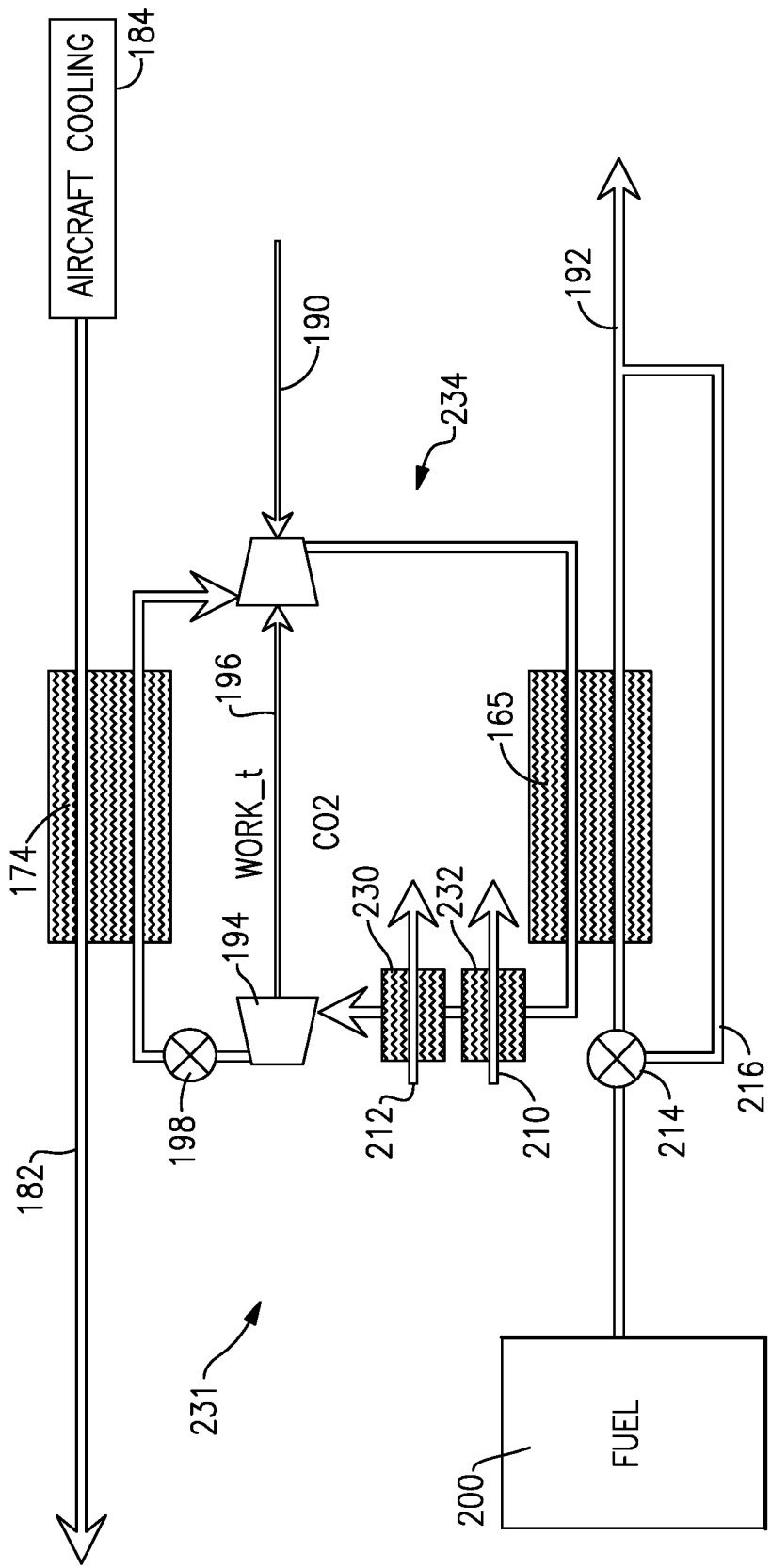
FIG. 5 is a schematic of a third system.

FIG. 5 shows another system 231, wherein the transcritical vapor cycle 234 heats a fuel in a line 192 at heat exchanger 165 and cools fluid in line 182 at heat exchanger 174. However, the vapor cycle 234 is provided with a heat exchanger 230 being cooled by air cycle machine air 212 and/or a heat exchanger 232, which is cooled by ram air 210.

Figure 6:
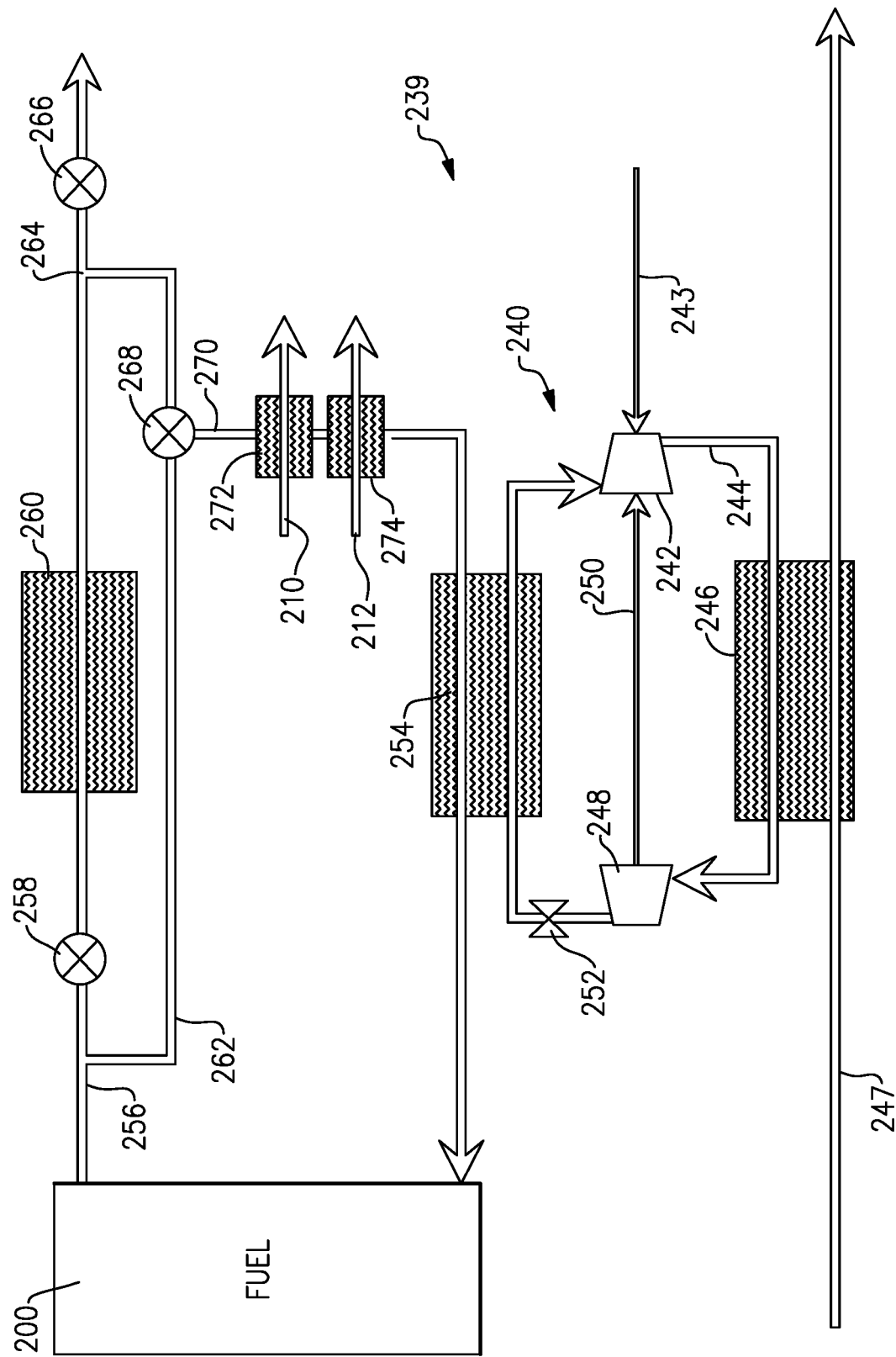
FIG. 6 is a schematic of a fourth system.

FIG. 6 shows yet another system 239 incorporating a transcritical vapor cycle 240. The compressor 242 is driven by a shaft 243 and passes refrigerant 244 to a heat exchanger 246. Heat exchanger 246 heats a fluid in line 247. This heated fluid may be utilized as a source of heat for any number of applications on the gas turbine engine.

As one example, the line 247 could simply be the air in the bypass duct passing over the heat exchanger 246 to remove the heat.

From heat exchanger 246, the refrigerant passes to a turbo expander 248 which optionally drives a shaft 250 to supplement the drive of the compressor 242. Downstream of the expander 248, the fluid may pass through an optional expander 252 and then into heat exchanger 254. Heat exchanger 254 is utilized here to cool the fuel being returned to the fuel tank 200. Now, the fuel line 256 passes through a valve 258. A bypass line 262 may bypass the heat exchanger 260. Heat exchanger 260 may be another heat exchanger associated with the aircraft and heating the fuel. As an example, the heat exchanger 260 may be part of an oil cooling system for another component such as a pump or turbine. That cooling fluid will become hot after cooling the component and can be utilized here to heat the fuel.

Downstream of the heat exchanger 260, the refrigerant returns at 264 to a main line. A valve 266 meters the flow of that fuel to the combustor. A valve 268 is shown controlling flow into a branch 270 which will return the fuel to the fuel tank 200. Heat exchanger 272 is provided with ram air 210 and heat exchanger 274 is provided with air cycle machine air 212.

However, the fuel will then pass through a heat exchanger 254 to further cool the fuel.

What the several embodiments that have been disclosed have in common is that the use of a transcritical vapor cycle ensures a high thermal lift and a large amount of heat transfer across the gas turbine engine systems.

Although an embodiment of this invention has been disclosed, a worker of ordinary skill in this art would recognize that certain modifications would come within the scope of this invention. For that reason, the following claims should be studied to determine the true scope and content of this invention.

The invention claimed is:
1. A gas turbine engine comprising:
a compressor section;
a combustor;
a turbine section;
a fuel supply system for supplying fuel to said combustor, and including a fuel heating heat exchanger, with a bypass line downstream of said fuel heating heat exchanger for bypassing fuel back to a fuel tank;
fuel in said bypass line being a fluid to be cooled;
an associated fluid to be heated; and
a transcritical vapor cycle for heating said fluid to be heated, and for cooling said fluid to be cooled, said transcritical vapor cycle including:
a gas cooler, in which said fluid to be heated is heated by a refrigerant in said transcritical vapor cycle;
an evaporator heat exchanger at which said fluid to be cooled is cooled by the refrigerant in said transcritical vapor cycle;
a compressor upstream of said gas cooler for compressing the refrigerant to a pressure above a critical point for the refrigerant; and
an expansion device for expanding the refrigerant downstream of said gas cooler;
wherein said evaporator heat exchanger is downstream of said expansion device, and the refrigerant passing through said gas cooler to heat said fluid to be heated is generally above the critical point;
wherein said refrigerant is $CO_2$; and
wherein there is a return line heat exchanger on said bypass line and upstream of said evaporator heat exchanger.

2. The gas turbine engine as set forth in claim 1, wherein said fluid to be heated is air in a bypass duct.

3. The gas turbine engine as set forth in claim 1, wherein said return line heat exchanger is cooled by ram cooling air.

4. The gas turbine engine as set forth in claim 1, wherein said return line heat exchanger is cooled by air from an air cycle machine.

5. A gas turbine engine comprising:
a compressor section;
a combustor;
a turbine section;
a fuel supply system for supplying fuel to said combustor, said fuel supply system having a fuel delivery line for delivering fuel from a fuel tank to said combustor and there being a fuel heating heat exchanger on said fuel delivery line, and there being a bypass line for bypassing fuel downstream of said fuel heating heat exchanger back to said fuel tank;
fuel in said bypass line being a fluid to be cooled;
an associated fluid to be heated; and
a transcritical vapor cycle for heating said fluid to be heated, and for cooling said fluid to be cooled, said transcritical vapor cycle including:
a gas cooler, in which said fluid to be heated is heated by a refrigerant in said transcritical vapor cycle;
an evaporator heat exchanger at which said fluid to be cooled is cooled by the refrigerant in said transcritical vapor cycle;
a compressor upstream of said gas cooler for compressing the refrigerant to a pressure above a critical point for the refrigerant; and
an expansion device for expanding the refrigerant downstream of said gas cooler;
wherein said evaporator heat exchanger is downstream of said expansion device, and the refrigerant passing through said gas cooler to heat said fluid to be heated is generally above the critical point;
wherein said expansion device is a turbo expander;
wherein said fluid to be heated is air in a bypass duct;
wherein said refrigerant is $CO_2$; and
wherein there is a return line heat exchanger on said bypass line and upstream of said evaporator heat exchanger.

6. The gas turbine engine as set forth in claim 5, wherein said turbo expander is configured to drive a shaft to provide drive input to said compressor.

7. The gas turbine engine as set forth in claim 6, wherein said return line heat exchanger is cooled by ram cooling air.

8. The gas turbine engine as set forth in claim 6, wherein said return line heat exchanger is cooled by air from an air cycle machine.

9. The gas turbine engine as set forth in claim 6, wherein there are a plurality of said return line heat exchangers.

10. The gas turbine engine as set forth in claim 5, wherein said return line heat exchanger is cooled by ram cooling air.

11. The gas turbine engine as set forth in claim 5, wherein said return line heat exchanger is cooled by air from an air cycle machine.

12. The gas turbine engine as set forth in claim 5, wherein there are a plurality of said return line heat exchangers.

13. A gas turbine engine comprising:
a compressor section;
a combustor;
a turbine section;
a fuel supply system for supplying fuel to said combustor, and including a fuel heating heat exchanger, with a bypass line downstream of said fuel heating heat exchanger for bypassing fuel back to a fuel tank;
fuel in said bypass line being a fluid to be cooled;
an associated fluid to be heated; and
a transcritical vapor cycle for heating said fluid to be heated, and for cooling said fluid to be cooled, said transcritical vapor cycle including:
a gas cooler, in which said fluid to be heated is heated by a refrigerant in said transcritical vapor cycle;
an evaporator heat exchanger at which said fluid to be cooled is cooled by the refrigerant in said transcritical vapor cycle;
a compressor upstream of said gas cooler for compressing the refrigerant to a pressure above a critical point for the refrigerant; and
an expansion device for expanding the refrigerant downstream of said gas cooler;
wherein said evaporator heat exchanger is downstream of said expansion device, and the refrigerant passing through said gas cooler to heat said fluid to be heated is generally above the critical point;
wherein said refrigerant is $CO_2$; and
wherein there is a return line heat exchanger on said bypass line and upstream of said evaporator heat exchanger.

14. The gas turbine engine as set forth in claim 13, wherein said return line heat exchanger is cooled by ram cooling air; or
said return line heat exchanger is cooled by air from an air cycle machine.

* * * * *